(12) United States Patent
Zhang

(10) Patent No.: US 10,311,820 B2
(45) Date of Patent: Jun. 4, 2019

(54) OVER CURRENT PROTECTION CIRCUIT AND LIQUID CRYSTAL DISPLAY

(71) Applicant: Shenzhen China Star Optoelectronics Technology Co., Ltd., Shenzhen, Guangdong (CN)

(72) Inventor: Xianming Zhang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 15/743,681

(22) PCT Filed: Sep. 30, 2017

(86) PCT No.: PCT/CN2017/104821
§ 371 (c)(1),
(2) Date: Jan. 11, 2018

(65) Prior Publication Data
US 2019/0080659 A1    Mar. 14, 2019

(30) Foreign Application Priority Data
Sep. 13, 2017 (CN) .......................... 2017 1 0823714

(51) Int. Cl.
*G09G 3/36* (2006.01)
*H02H 7/20* (2006.01)
*H02H 1/00* (2006.01)

(52) U.S. Cl.
CPC ......... *G09G 3/3677* (2013.01); *H02H 1/0007* (2013.01); *H02H 7/20* (2013.01);
(Continued)

(58) Field of Classification Search
CPC ......... G09G 3/3677; G09G 2300/0871; G09G 2310/0291; G09G 2330/04; H02H 1/0007; H02H 7/20
See application file for complete search history.

(56) References Cited

U.S. PATENT DOCUMENTS 9,947,283 B2 *   4/2018  Chen ..................... G09G 3/3677
10,102,818 B2 *  10/2018 Kuo ...................... G09G 3/3677
(Continued)

FOREIGN PATENT DOCUMENTS

CN    104700811 A    6/2015
CN    105161046 A    12/2015
(Continued)

*Primary Examiner* — Peter D McLoone
(74) *Attorney, Agent, or Firm* — Andrew C. Cheng

(57) ABSTRACT

Disclosed is an over current protection circuit, comprising N left over current protection sub circuit and N right over current protection sub circuit, applied in the GOA circuit having a dual driving function, each of the left GOA units and right GOA units can be driven by the clock control signals outputted respectively by the corresponding left and right level shifting sub circuits; the first left level shifting sub circuit and the first left GOA unit are coupled through the first left clock line, the first left over current protection sub circuit, which is coupled to the first left clock line in series or arranged between the first left clock line and the first left level shifting sub circuit controls the first left level shifting sub circuit to stop outputting the first left clock control signal when the first left driving current is larger than a predetermined current threshold value.

13 Claims, 3 Drawing Sheets

(52) U.S. Cl.
CPC ........... *G09G 2300/0871* (2013.01); *G09G 2310/0291* (2013.01); *G09G 2330/04* (2013.01)

(56) References Cited

U.S. PATENT DOCUMENTS

| | | | |
|---|---|---|---|
| 2002/0000965 A1 | 1/2002 | Ando | |
| 2010/0220079 A1 | 9/2010 | Bang et al. | |
| 2017/0221440 A1* | 8/2017 | Chen | G09G 3/3677 |
| 2017/0256222 A1* | 9/2017 | Kuo | G09G 3/3677 |
| 2018/0197498 A1* | 7/2018 | Chen | G09G 3/3677 |
| 2018/0218701 A1* | 8/2018 | Yi | G09G 3/3677 |
| 2018/0277051 A1* | 9/2018 | Du | G09G 3/3677 |

FOREIGN PATENT DOCUMENTS

| | | |
|---|---|---|
| CN | 105304050 A | 2/2016 |
| CN | 105448260 A | 3/2016 |
| CN | 105469761 A | 4/2016 |
| CN | 105810163 A | 7/2016 |
| CN | 106169289 A | 11/2016 |
| CN | 106297702 A | 1/2017 |
| CN | 106448522 A | 2/2017 |
| CN | 106843354 A | 6/2017 |

\* cited by examiner

US 10,311,820 B2

OVER CURRENT PROTECTION CIRCUIT AND LIQUID CRYSTAL DISPLAY

CROSS REFERENCE

This application claims the priority of Chinese Patent Application No. 201710823714.6, entitled "Over current protection circuit and liquid crystal display", filed on Sep. 13, 2017, the disclosure of which is incorporated herein by reference in its entirety.

FIELD OF THE INVENTION

The present invention relates to a display technology field, and more particularly to an over current protection circuit and a liquid crystal display.

BACKGROUND OF THE INVENTION

The GOA (Gate Driver on Array) technology is a kind of skill which manufactures the Thin Film Transistor (TFT) gate scan drive circuit on the TFT array substrate to replace the drive chip manufactured by the external silicon chip. The gate voltage for the TFTs of each row in the liquid crystal display can be provided by the GOA circuit. In the GOA circuit, a level shifter is generally used to generate a clock control signal to control on and off of the TFTs of each row.

In the manufacturing process of the liquid crystal display, if the sealant of the liquid crystal display is not tight or there is dust inside the panel, it is easy to cause the output signal of the level shifter to be short-circuited. Currently, in order to prevent the short circuit of the clock control signal in the panel, an over current protection (OCP) circuit is generally provided to turn off the level shifter to prevent the liquid crystal display panel from being burned out. However, for the liquid crystal display panel utilizing the dual driving mode, the current OCP detection is to control the entire panel without signal output with the level shifter when some portion inside the panel is detected to be short-circuited. Then, the entire can only be scrapped.

SUMMARY OF THE INVENTION

The present invention provides an over current protection circuit and a liquid crystal display, which can achieving the working mode as the gate driver on array (GOA) is in short circuit such that the GOA at one side is in short circuit and the GOA at the other side still can works normally.

First, the present invention provides an over current protection circuit, applied in a substrate array row driving gate driver on array (GOA) circuit having a dual driving function, wherein the GOA circuit having the dual driving function comprises N left GOA units, N right GOA units, a left level shifting circuit and a right level shifting circuit, wherein the over current protection circuit comprises a left over current protection circuit and a right over current protection circuit, the left over current protection circuit comprises N left over current protection sub circuits and the right over current protection circuit comprises N right over current protection sub circuits; the left level shifting circuit comprises N left level shifting sub circuits and the right level shifting circuit comprises N right level shifting sub circuits, each of the left GOA units is driven by a corresponding left level shifting sub circuit and each of the right GOA units is driven by a corresponding right level shifting sub circuit, N is an positive integer;

a first left GOA unit and a first left level shifting sub circuit are coupled through a first left clock line, a first left over current protection sub circuit is coupled to the first left clock line and the first left level shifting sub circuit; a first right GOA unit and a first right level shifting sub circuit are coupled through a first right clock line, a first right over current protection sub circuit is coupled to the first right clock line and the first right level shifting sub circuit; the first left GOA unit is any one of the N left GOA units and the first right GOA unit is any one of the N right GOA units;

when the first left level shifting circuit works, the first left level shifting circuit generates a first left clock control signal to be outputted to the first left GOA unit through the first left clock line; when the first right level shifting circuit works, the first right level shifting circuit generates a first right clock control signal to be outputted to the first right GOA unit through the first right clock line; the first left clock control signal has the same timing as the first right clock control signal;

the first left over current protection sub circuit detects a first left driving current on the first left clock line and controls the first left level shifting sub circuit to stop working when the first left driving current is larger than a predetermined current threshold value; the first right over current protection sub circuit detects a first right driving current on the first right clock line and controls the first right level shifting sub circuit to stop working when the first right driving current is larger than the predetermined current threshold value.

The first left over current protection sub circuit outputs a first left stopping control signal to the first left level shifting sub circuit when first left driving current is larger than the predetermined current threshold value to control the first left level shifting sub circuit to stop working;

The first right over current protection sub circuit outputs a first right stopping control signal to the first right level shifting sub circuit when first right driving current is larger than the predetermined current threshold value to control the first right level shifting sub circuit to stop working.

The first left level shifting sub circuit comprises a first left controlling circuit and a first left amplifying circuit, when the first left level shifting sub circuit normally works, the first left amplifying circuit converts a clock signal inputted to the first left controlling circuit by a clock controller into the first left clock control signal; the first left controlling circuit controls the first left amplifying circuit to stop working when the first left controlling circuit receives the first left stopping control signal;

The first right level shifting sub circuit comprises a first right controlling circuit and a first right amplifying circuit, when the first right level shifting sub circuit works, the first right amplifying circuit converts a clock signal inputted to the first right controlling circuit by a clock controller into the first right clock control signal; the first right controlling circuit controls the first right amplifying circuit to stop working when the first right controlling circuit receives the first right stopping control signal.

The over current protection circuit first provided by the present invention comprises N left over current protection sub circuit and N right over current protection sub circuit and can be applied in the GOA circuit having the dual driving function. The GOA circuit comprises N left GOA units, N right GOA units. Each of the left GOA units and right GOA units can be driven by the clock control signals outputted respectively by the corresponding left level shifting sub circuit and corresponding right level shifting sub circuit, wherein the first left level shifting sub circuit and the first left GOA unit are coupled through the first left clock line, the first left over current protection sub circuit coupled to the first left clock line and the first left level shifting sub circuit controls the first left level shifting sub circuit to stop working when the first left driving current on the first left clock line is larger than the predetermined current threshold value; the first right level shifting sub circuit and the first right GOA unit are coupled through the first right clock line, the first right over current protection sub circuit coupled to the first right clock line and the first right level shifting sub circuit controls the first right level shifting sub circuit to stop working when the first right driving current on the first right clock line is larger than the predetermined current threshold value. Accordingly, when the first left clock line of the first left GOA unit is in short circuit, the first right clock control signal outputted to the first right GOA unit will not be affected and the TFT corresponding to the GOA unit of the row still can work normally. By implementing the embodiment of the present invention, it can be realized that the clock line at one side of the GOA circuit is in short circuit and the clock line at the other side still can work normally without bringing other risks.

Second, the present invention provides another over current protection circuit, applied in a substrate array row driving gate driver on array (GOA) circuit having a dual driving function, wherein the GOA circuit having the dual driving function comprises N left GOA units, N right GOA units, a left level shifting circuit and a right level shifting circuit, wherein the over current protection circuit comprises a left over current protection circuit and a right over current protection circuit, the left over current protection circuit comprises N left over current protection sub circuits and the right over current protection circuit comprises N right over current protection sub circuits, both the left over current protection sub circuits and the right over current protection sub circuits are fuses; the left level shifting circuit comprises N left level shifting sub circuits and the right level shifting circuit comprises N right level shifting sub circuits, each of the left GOA units is driven by a corresponding left level shifting sub circuit and each of the right GOA units is driven by a corresponding right level shifting sub circuit, N is an positive integer;

a first left GOA unit and a first left level shifting sub circuit are coupled through a first left clock line, a first left over current protection sub circuit is coupled to the first left clock line in series; a first right GOA unit and a first right level shifting sub circuit are coupled through a first right clock line, a first right over current protection sub circuit is coupled to the first right clock line in series; the first left GOA unit is any one of the N left GOA units and the first right GOA unit is any one of the N right GOA units;

when the first left level shifting circuit works, the first left level shifting circuit generates a first left clock control signal to be outputted to the first left GOA unit through the first left clock line; when the first right level shifting circuit works, the first right level shifting circuit generates a first right clock control signal to be outputted to the first right GOA unit through the first right clock line; the first left clock control signal has the same timing as the first right clock control signal;

the first left over current protection sub circuit is fused when the first left clock control signal on the first left clock line is larger than a predetermined current threshold value to stop the first left level shifting sub circuit outputting the first left clock control signal to the first left GOA unit; the first right over current protection sub circuit is fused when the first right clock control signal on the first right clock line is larger than the predetermined current threshold value to stop the first right level shifting sub circuit outputting the first right clock control signal to the first right GOA unit.

Both the first left over current protection sub circuit and the first right over current protection sub circuit are recoverable fuses.

The first left level shifting sub circuit comprises a first left controlling circuit and a first left amplifying circuit, when the first left level shifting sub circuit normally works, the first left amplifying circuit converts a clock signal inputted to the first left controlling circuit by a clock controller into the first left clock control signal; the first left controlling circuit controls the first left amplifying circuit to stop working when the first left controlling circuit receives the first left stopping control signal;

The first right level shifting sub circuit comprises a first right controlling circuit and a first right amplifying circuit, when the first right level shifting sub circuit works, the first right amplifying circuit converts a clock signal inputted to the first right controlling circuit by a clock controller into the first right clock control signal; the first right controlling circuit controls the first right amplifying circuit to stop working when the first right controlling circuit receives the first right stopping control signal.

The over current protection circuit second provided by the present invention can be applied in the GOA circuit having the dual driving function. The GOA circuit comprises N left GOA units, N right GOA units. Each of the left GOA units and right GOA units can be driven by the clock control signals outputted respectively by the corresponding left level shifting sub circuit and corresponding right level shifting sub circuit; the over current protection circuit comprises N left fuses and N right fuses, wherein the first left level shifting sub circuit and the first left GOA unit are coupled through the first left clock line, the first left fuse coupled to the first left clock line in series controls the first left level shifting sub circuit to stop outputting the first left clock control signal to the first left GOA unit when the first left driving current on the first left clock line is larger than the predetermined current threshold value; the first right level shifting sub circuit and the first right GOA unit are coupled through the first right clock line, the first right fuse coupled to the first right clock line in series controls the first right level shifting sub circuit to stop outputting the first right clock control signal to the first right GOA unit when the first right driving current on the first right clock line is larger than the predetermined current threshold value. Accordingly, when the first left clock line of the first left GOA unit is in short circuit, the first right clock control signal outputted to the first right GOA unit will not be affected and the GOA unit of the row still can provide the gate voltage to the TFTs of the row, normally. By implementing the embodiment of the present invention, it can be realized that the clock line at one side of the GOA circuit is in short circuit and the clock line at the other side still can work normally.

Third, the present invention further provides a liquid crystal display including the over current protection circuit.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments. It is clear that the described embodiments are part of embodiments of the present application, but not all embodiments. Based on the embodiments of the present invention, all other embodiments to those of ordinary skill in the premise of no creative efforts obtained, should be considered within the scope of protection of the present invention.

Besides, the following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Besides, in the description of the present invention, unless with being indicated otherwise, "plurality" means two or more. In the present specification, the term "process" encompasses an independent process, as well as a process that cannot be clearly distinguished from another process but yet achieves the expected effect of the process of interest. Moreover, in the present specification, any numerical range expressed herein using "to" refers to a range including the numerical values before and after "to" as the minimum and maximum values, respectively. In figures, the same reference numbers will be used to refer to the same or like parts.

The embodiment of the present invention provides an over current protection circuit and a liquid crystal display, which can achieving the working mode as the gate driver on array (GOA) is in short circuit such that the GOA at one side is in short circuit and the GOA at the other side still can works normally without bringing other risks. The detail descriptions are respectively introduced below.

Figure 1:
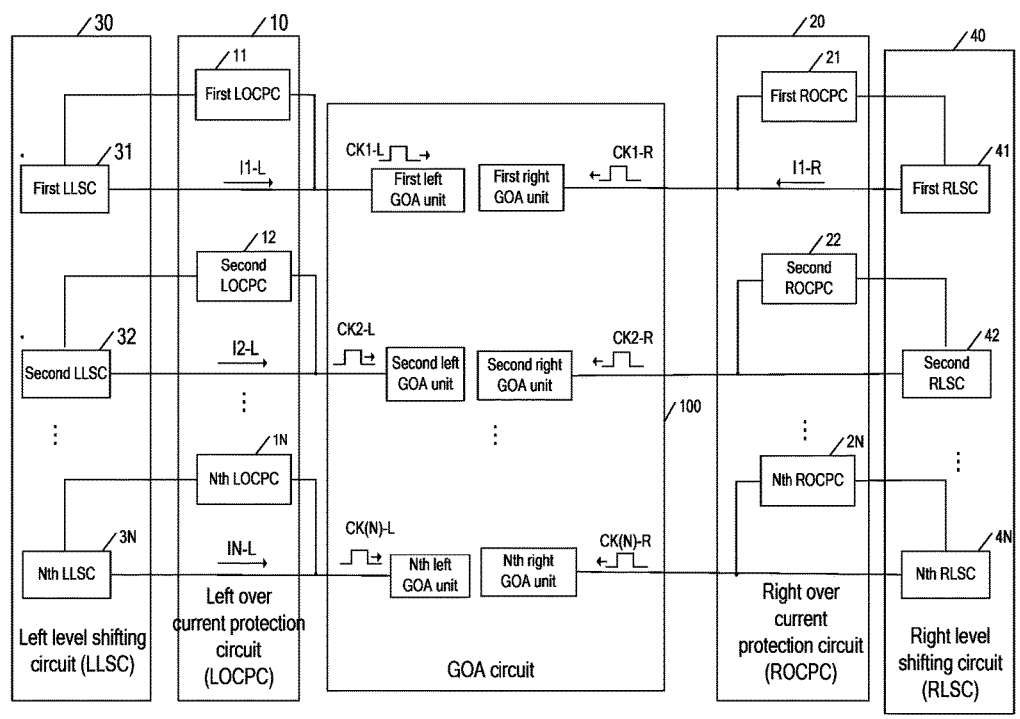
FIG. 1 is a diagram of an over current protection circuit disclosed by the embodiment of the present invention.

Please refer to FIG. 1. FIG. 1 is a diagram of an over current protection circuit disclosed by the embodiment of the present invention. As shown in FIG. 1, the over current protection circuit described in the embodiment comprises a left over current protection circuit 10 and a right over current protection circuit 20. The left over current protection circuit 10 comprises N left over current protection sub circuits (the first left over current protection sub circuit 11, the second left over current protection sub circuit 12, . . . , the Nth left over current protection sub circuit 1N shown in FIG. 1). The right over current protection circuit 20 comprises N right over current protection sub circuits (the first right over current protection sub circuit 21, the second right over current protection sub circuit 22, . . . , the Nth right over current protection sub circuit 2N shown in FIG. 1).

The over current protection circuit is applied in a substrate array row driving gate driver on array (GOA) circuit having a dual driving function. The substrate array row driving gate driver on array (GOA) circuit having the dual driving function comprises N left GOA units which are cascade coupled (the first left GOA unit, the second left GOA unit, . . . , the Nth left GOA unit shown in FIG. 1, wherein N is an integer larger than 1), N right GOA units which are cascade coupled (the first right GOA unit, the second right GOA unit, . . . , the Nth right GOA unit shown in FIG. 1), a left level shifting circuit 30 and a right level shifting circuit 40. The first left GOA unit and the first right GOA unit jointly drive the same scan line, the first left GOA unit and the first right GOA unit jointly drive the same scan line and so on. The N left GOA units and the N right GOA units are respectively arranged at left side and the right side of the display panel to implement dual driving to all the scan lines. Namely, the N left GOA units drive all the scan lines from left to right and meanwhile, the N right GOA units drive all the scan lines from right to left. The left GOA unit of each stage and the right GOA unit of each stage correspond to the thin film transistors (TFTs) of the same row. Namely, the left GOA unit and the right GOA unit of the same stage jointly act for driving the pixels of the same row.

The left level shifting circuit 30 comprises N left level shifting sub circuits (the first left level shifting sub circuit 31, the second left level shifting sub circuit 32, . . . , the Nth left level shifting sub circuit 3N shown in FIG. 1). The right level shifting circuit 40 comprises N right level shifting sub circuits (the first right level shifting sub circuit 41, the second right level shifting sub circuit 42, . . . , the Nth right level shifting sub circuit 4N shown in FIG. 1). Each left GOA unit is driven by the clock control signal outputted by the corresponding left level shifting sub circuit and each right GOA unit is driven by the clock control signal outputted by the corresponding right level shifting sub circuit. The timings (sequences) of the clock control signals received by the left GOA unit and the right GOA unit of the same stage which are at two sides are the same.

In the following, the left GOA unit and the right GOA unit corresponding to the TFTs of the first row are taken as an illustration. The first left GOA unit is any one of the N left GOA units, and the first right GOA unit is any one of the N right GOA units. Specifically, the first left GOA unit and the output end of the first left level shifting sub circuit 31 are coupled through the first left clock line and the first left over current protection sub circuit 11 connects the first left clock line and the control end of the first left level shifting sub circuit 31; the first right GOA unit and the output end of the first right level shifting sub circuit 31 are coupled through the first right clock line and the first right over current protection sub circuit 21 connects the first right clock line and the control end of the first right level shifting sub circuit 41; the first left level shifting sub circuit 31 is a left level shifting sub circuit corresponding to the first left GOA unit and the first right level shifting sub circuit 41 is a left level shifting sub circuit corresponding to the first right GOA unit.

Optionally, the first left level shifting sub circuit 31 and the first left over current protection sub circuit 11 can be arranged inside one level shifting chip; the first right level shifting sub circuit 41 and the first right over current protection sub circuit 21 are arranged inside another level shifting chip. The second left level shifting sub circuit 32 and the second left over current protection sub circuit 12 can be arranged inside a third level shifting chip and so on. Optionally, the left level shifting circuit 30 comprising the N left level shifting sub circuits and the left over current protection circuit 10 comprising the N left over current protection sub circuits are arranged in one level shifting chip. The right level shifting circuit 40 comprising the N right level shifting sub circuits and the right over current protection circuit 20 comprising the N right over current protection sub circuits are arranged in another level shifting chip. Or, the left level shifting circuit 30, the left over current protection circuit 10, the right level shifting circuit 40 and the right over current protection circuit 20 are all arranged in the same level shifting chip.

When the first left level shifting sub circuit 31 works, the first left level shifting sub circuit 31 generates a first left clock control signal CK1-L. The first left clock control signal CK1-L is outputted to the first left GOA unit through the first left clock line to control on and off of the TFTs of the row.

Similarly, when the first right level shifting sub circuit 41 works, the first right level shifting sub circuit 41 generates a first right clock control signal CK1-R. The first right clock control signal CK1-R is outputted to the first right GOA unit through the first right clock line. The timings (sequences) of the first left clock control signal CK1-L and the first right clock control signal CK1-R are the same.

The first left over current protection sub circuit 11 detects a first left driving current I1-L on the first left clock line and controls the first left level shifting sub circuit 31 to stop working when the first left driving current I1-L is larger than a predetermined current threshold value such that the first left clock line enters the short circuit protection state. Namely, the first left level shifting sub circuit 31 stops generating the first left clock control signal CK1-L to the first left GOA unit. Then, the output of the first left level shifting sub circuit 31 is in Hi-Z (high-impedance state). Then, for the TFT array of the first row in the liquid crystal display panel, the dual driving mode becomes the single driving mode and the liquid crystal display panel still can work normally but only the effect of the panel display may be slightly lower to reduce the panel level. Specifically, the state different from the high-impedance state is a normal state. in the normal state, the first left level shifting sub circuit 31 generates the first left clock control signal CK1-L of low level or high level to be outputted to the first left GOA unit.

Similarly, the first right over current protection sub circuit 21 detects a first right driving current I1-R on the first right clock line and controls the first right level shifting sub circuit 41 to stop working when the first right driving current I1-R is larger than the predetermined current threshold value.

Furthermore, the first left over current protection sub circuit 11 detects a first left driving current on the first left clock line and controls the first left level shifting sub circuit 31 to stop outputting a first left stopping control signal to control the first left level shifting sub circuit 31 to stop working with the first left stopping control signal. Similarly, the first right over current protection sub circuit 21 detects a first right driving current on the first right clock line and controls the first right level shifting sub circuit 41 to stop outputting a first right stopping control signal. The first left stopping control signal can control the first right level shifting sub circuit 41 to stop working.

Specifically, the first left over current protection sub circuit 11 is illustrated and may comprise a current detector and a current comparator which are sequentially connected in series. One end of the current detector is coupled to the first left clock line. The output end of the current comparator is coupled to the control end of the first level shifting sub circuit 31. Certainly, the structure is not limited thereto. The current detector can be used to detect the first left driving current I1-L on the first left clock line. The current comparator compares the first left driving current I1-L detected by the current detector with a predetermined current threshold value and the result of the comparison is fed back (or outputted) to the control end of the first left level shifting sub circuit 31. The first left level shifting sub circuit 31 is controlled to stop outputting the first left clock control signal CK1-L to the first left GOA unit when the first left driving current I1-L on the first left clock line is larger than the predetermined current threshold value.

With the above analysis, the left clock control signal and the right clock control signal provided to the first left GOA unit and the first right GOA unit in the embodiment of the present invention are generated by two independent level shifting sub circuits. These two level shifting sub circuits are respectively controlled by one over current sub circuit. Mainly, it is to respectively control these two level shifting sub circuits to stop generating corresponding clock control signal to the first left GOA unit or the first right GOA unit when the left clock line or the right clock line has the short circuit condition. Thus, the over current protection circuit according to the embodiment of the present invention will not provide the first left clock control signal CK1-L to the first left GOA unit but the first right clock control signal CK1-R outputted to the first right GOA unit will not be affected when the first clock line of the first left GOA unit is in short circuit. The TFTs driven by the left GOA unit and the right GOA unit still can work normally. Meanwhile, the clock control signal of the left GOA unit and the right GOA unit of other stages will not be affected, either to ensure the normal display of the liquid crystal panel.

Figure 2:
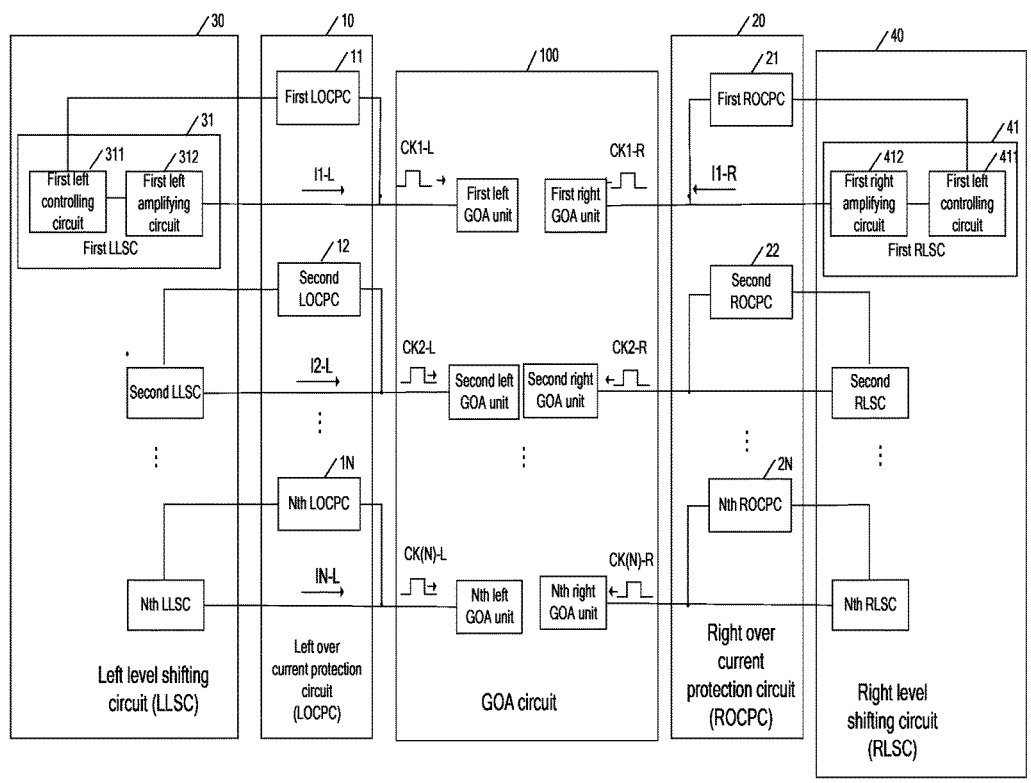
FIG. 2 is a diagram of another over current protection circuit disclosed by the embodiment of the present invention.

Optionally, referring to FIG. 2, FIG. 2 is a diagram of another over current protection circuit disclosed by the embodiment of the present invention. As shown in FIG. 2, the over current protection circuit shown in this embodiment is substantially the same as the over current protection circuit shown in FIG. 1. Please refer to the description of the over current protection circuit shown in FIG. 1 in the above embodiment, and the details are not described here, again.

Furthermore, the difference is that in the over current circuit described in the embodiment shown in FIG. 2, the first left level shifting sub circuit 31 comprises a first left controlling circuit 311 and a first left amplifying circuit 312, when the first left level shifting sub circuit 31 normally works, a clock controller (not shown in figure, so called logic board TCON) inputs a clock signal to the first left controlling circuit 311. The first left amplifying circuit 312 amplifies the clock signal received by the first left controlling circuit 311 into the first left clock control signal CK1-L and outputs the same to the first left GOA unit. When the first left over current protection sub circuit 11 detects that the first left driving current on the first left clock line is larger than the predetermined current threshold value, it outputs the first left stopping control signal to the first left controlling circuit 311 of the first left level shifting sub circuit 31. When the first left controlling circuit 311 receives the first left stopping control signal, the first left controlling circuit 311 controls the first left amplifying circuit 312 to stop working.

Similarly, the first right level shifting sub circuit 41 comprises a first right controlling circuit 411 and a first right amplifying circuit 412, when the first right level shifting sub circuit 41 normally works, the first left amplifying circuit 312 amplifies the clock signal inputted to the first right controlling circuit 411 by the clock controller into the first right clock control signal CK1-R and outputs the same to the first right GOA unit. When the first right over current protection sub circuit 21 detects that the first right driving current on the first right clock line is larger than the predetermined current threshold value, it outputs the first right stopping control signal to the first right controlling circuit 411 of the first right level shifting sub circuit 41. When the first right controlling circuit 411 receives the first right stopping control signal, the first right controlling circuit 411 controls the first right amplifying circuit 412 to stop working.

Figure 3:
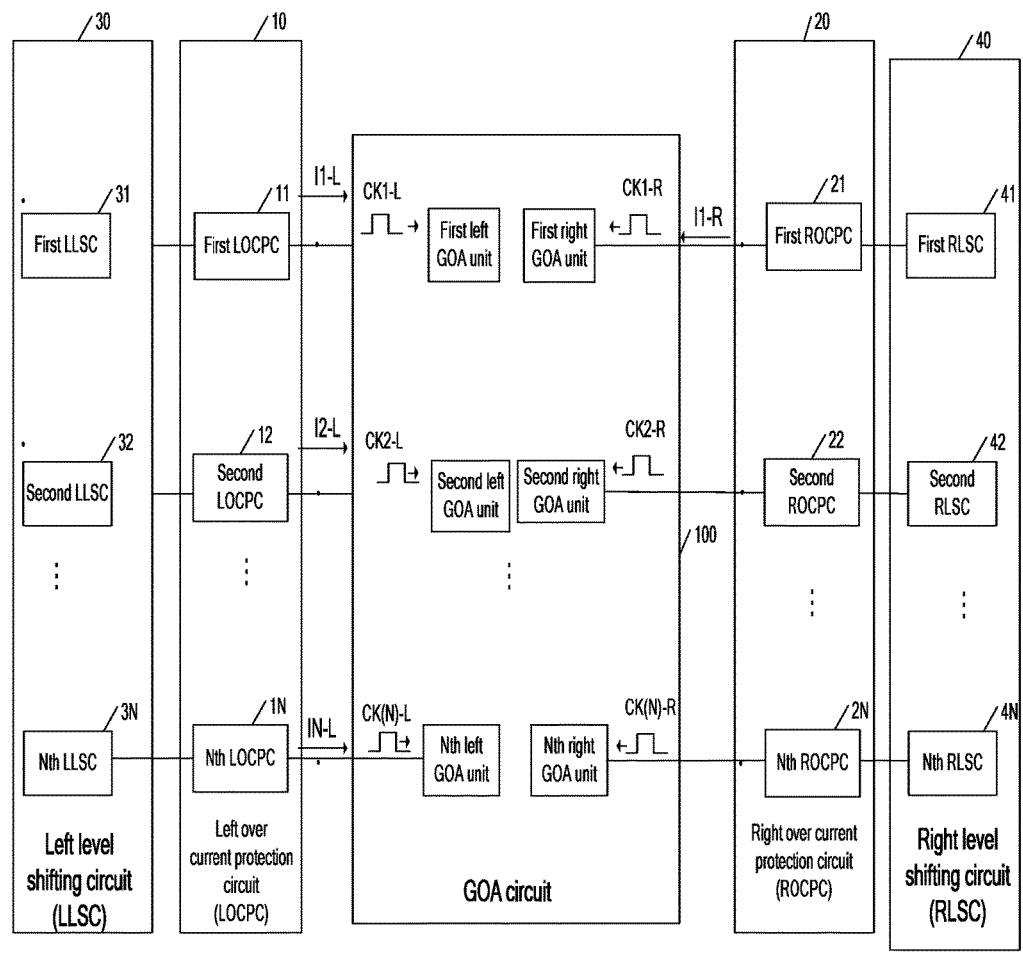
FIG. 3 is a diagram of one another over current protection circuit disclosed by the embodiment of the present invention.

Optionally, referring to FIG. 3, FIG. 3 is a specific diagram of one another over current protection circuit disclosed by the embodiment of the present invention. As shown in FIG. 3, the over current protection circuit shown in this embodiment comprises a left over current protection circuit 10 and a right over current protection circuit 20. The left over current protection circuit 10 comprises N left over current protection sub circuits (also named as left fuses) (the first left over current protection sub circuit 11, the second left over current protection sub circuit 12, . . . , the Nth left over current protection sub circuit 1N shown in FIG. 3). The right over current protection circuit 20 comprises N right over current protection sub circuits (also named as left fuses) (the first right over current protection sub circuit 21, the second right over current protection sub circuit 22, . . . , the Nth right over current protection sub circuit 2N shown in FIG. 1).

The over current protection circuit is applied in a substrate array row driving gate driver on array (GOA) circuit having a dual driving function. The GOA circuit having the dual driving function comprises N left GOA units which are cascade coupled, N right GOA units which are cascade coupled, a left level shifting circuit 30 and a right level shifting circuit 40. Both the GOA unit at the left and the GOA unit at the right of the same stage correspond to the TFTs of the same row. The left level shifting circuit 30 comprises N left level shifting sub circuits (the first left level shifting sub circuit 31, the second left level shifting sub circuit 32, . . . , the Nth left level shifting sub circuit 3N shown in FIG. 3). The right level shifting circuit 40 comprises N right level shifting sub circuits (the first right level shifting sub circuit 41, the second right level shifting sub circuit 42, . . . , the Nth right level shifting sub circuit 4N shown in FIG. 3). Each left GOA unit is driven by the clock control signal outputted by the corresponding left level shifting sub circuit and each right GOA unit is driven by the clock control signal outputted by the corresponding right level shifting sub circuit.

In the following, the left GOA unit and the right GOA unit corresponding to the TFTs of the first row are taken as an illustration. The first left GOA unit is any one of the N left GOA units, and the first right GOA unit is any one of the N right GOA units. Specifically, the first left GOA unit and the output end of the first left level shifting sub circuit 31 are coupled through the first left clock line and a first left fuse 11 is coupled to the first left clock line in series; the first right GOA unit and the first right level shifting sub circuit 41 are coupled through a first right clock line, a first right fuse 21 is coupled to the first right clock line in series; the first left level shifting sub circuit 31 is a left level shifting sub circuit corresponding to the first left GOA unit and the first right level shifting sub circuit 41 is a left level shifting sub circuit corresponding to the first right GOA unit.

When the first left level shifting sub circuit 31 works, the first left level shifting sub circuit 31 generates a first left clock control signal CK1-L. The first left clock control signal CK1-L is outputted to the first left GOA unit through the first left clock line to control on and off of the TFTs of the row.

Similarly, when the first right level shifting sub circuit 41 works, the first right level shifting sub circuit 41 generates a first right clock control signal CK1-R. The first right clock control signal CK1-R is outputted to the first right GOA unit through the first right clock line. The timings (sequences) of the first left clock control signal CK1-L and the first right clock control signal CK1-R are the same.

The first left fuse 11 is self fused when the first left driving current I1-L on the first left clock line is larger than a predetermined current threshold value (the fusing current of the fuse) to control the first left level shifting sub circuit 31 to stop outputting the first left clock control signal CK1-L to the first left GOA unit. Then, the output of the first left level shifting sub circuit 31 is in Hi-Z (high-impedance state). Similarly, the first right fuse 21 controls the right level shifting sub circuit 41 to stop working when the first right driving current I1-R on the first right clock line is larger than the predetermined current threshold value. Indirectly, the first left fuse also functions to detect the first left driving current on the first left clock line.

Furthermore, for the first left GOA unit and the first right GOA unit of the same stage, the fusing current of the first left fuse 11 (the first left over current protection sub circuit) and the fusing current of the first right fuse 21 (the first right over current protection sub circuit) are the same.

Preferably, both the first left fuse 11 and the first right fuse 21 are recoverable fuses. Specifically, when the first left driving current I1-L on the first left clock line is smaller than the predetermined current threshold value (the fusing current of the fuse), the fuse resumes a good on-state so as to sustainably implementing short circuit protection to the first left clock line coupled to the first left GOA unit.

The over current protection circuit in FIG. 3 also can keep the first right clock control signal outputted to the first right GOA unit not being affected and the GOA unit of the stage still can work normally when the first left clock line of the first left GOA unit is in short circuit. Under such circumstance, the structure of the first left level shifting sub circuit 31 and the first right level shifting sub circuit 41 in FIG. 3 may also be replaced by the structure similar to that in FIG. 2 and details are not described here, again. The difference is that when the first left over current protection sub circuit is fused, the first left controlling circuit controls the first left amplifying circuit to stop working; when the first right over current protection sub circuit is fused, the first right controlling circuit controls the first right amplifying circuit to stop working.

The embodiment of the present invention further provides a liquid crystal display comprising an over current protection circuit as shown in any one of FIGS. 1-3. The GOA circuit having dual driving function is arranged at the left side and the right side of the active area of the liquid crystal display. The over current protection circuit can be referred to the aforementioned description shown in FIG. 1 to FIG. 3. The repeated description is omitted here.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

The detail description has been introduced above for the over current protection circuit and the liquid crystal display provided by the embodiment of the invention. Herein, a specific case is applied in this article for explain the principles and specific embodiments of the present invention have been set forth. The description of the aforesaid embodiments is only used to help understand the method of the present invention and the core idea thereof; meanwhile, for those of ordinary skill in the art, according to the idea of the present invention, there should be changes either in the specific embodiments and applications but in sum, the contents of the specification should not be limitation to the present invention.

What is claimed is:

1. An over current protection circuit, applied in a substrate array row driving gate driver on array (GOA) circuit having a dual driving function, wherein the GOA circuit having the dual driving function comprises N left GOA units, N right GOA units, a left level shifting circuit and a right level shifting circuit, wherein the over current protection circuit comprises a left over current protection circuit and a right over current protection circuit, the left over current protection circuit comprises N left over current protection sub circuits and the right over current protection circuit comprises N right over current protection sub circuits, the left level shifting circuit comprises N left level shifting sub circuits and the right level shifting circuit comprises N right level shifting sub circuits, each of the left GOA units is driven by a corresponding left level shifting sub circuit and each of the right GOA units is driven by a corresponding right level shifting sub circuit, N is an positive integer;

a first left GOA unit and a first left level shifting sub circuit are coupled through a first left clock line, a first left over current protection sub circuit is coupled to the first left clock line and the first left level shifting sub circuit; a first right GOA unit and a first right level shifting sub circuit are coupled through a first right clock line, a first right over current protection sub circuit is coupled to the first right clock line and the first right level shifting sub circuit; the first left GOA unit is any one of the N left GOA units and the first right GOA unit is any one of the N right GOA units;

when the first left level shifting circuit works, the first left level shifting circuit generates a first left clock control signal to be outputted to the first left GOA unit through the first left clock line; when the first right level shifting circuit works, the first right level shifting circuit generates a first right clock control signal to be outputted to the first right GOA unit through the first right clock line; the first left clock control signal has the same timing as the first right clock control signal;

the first left over current protection sub circuit detects a first left driving current on the first left clock line and controls the first left level shifting sub circuit to stop working when the first left driving current is larger than a predetermined current threshold value; the first right over current protection sub circuit detects a first right driving current on the first right clock line and controls the first right level shifting sub circuit to stop working when the first right driving current is larger than the predetermined current threshold value.

2. The over current protection circuit according to claim 1, wherein the first left over current protection sub circuit outputs a first left stopping control signal to the first left level shifting sub circuit when first left driving current is larger than the predetermined current threshold value to control the first left level shifting sub circuit to stop working.

3. The over current protection circuit according to claim 2, wherein the first left level shifting sub circuit comprises a first left controlling circuit and a first left amplifying circuit, when the first left level shifting sub circuit works, the first left amplifying circuit converts a clock signal inputted to the first left controlling circuit by a clock controller into the first left clock control signal; the first left controlling circuit controls the first left amplifying circuit to stop working when the first left controlling circuit receives the first left stopping control signal.

4. The over current protection circuit according to claim 1, wherein the first right over current protection sub circuit outputs a first right stopping control signal to the first right level shifting sub circuit when first right driving current is larger than the predetermined current threshold value to control the first right level shifting sub circuit to stop working.

5. The over current protection circuit according to claim 4, wherein the first right level shifting sub circuit comprises a first right controlling circuit and a first right amplifying circuit, when the first right level shifting sub circuit works, the first right amplifying circuit converts a clock signal inputted to the first right controlling circuit by a clock controller into the first right clock control signal; the first right controlling circuit controls the first right amplifying circuit to stop working when the first right controlling circuit receives the first right stopping control signal.

6. An over current protection circuit, applied in a substrate array row driving gate driver on array (GOA) circuit having a dual driving function, wherein the GOA circuit having the dual driving function comprises N left GOA units, N right GOA units, a left level shifting circuit and a right level shifting circuit, wherein the over current protection circuit comprises a left over current protection circuit and a right over current protection circuit, the left over current protection circuit comprises N left over current protection sub circuits and the right over current protection circuit comprises N right over current protection sub circuits, both the left over current protection sub circuits and the right over current protection sub circuits are fuses, the left level shifting circuit comprises N left level shifting sub circuits and the right level shifting circuit comprises N right level shifting sub circuits, each of the left GOA units is driven by a corresponding left level shifting sub circuit and each of the right GOA units is driven by a corresponding right level shifting sub circuit, N is an positive integer;

a first left GOA unit and a first left level shifting sub circuit are coupled through a first left clock line, a first left over current protection sub circuit is coupled to the first left clock line in series; a first right GOA unit and a first right level shifting sub circuit are coupled through a first right clock line, a first right over current protection sub circuit is coupled to the first right clock line in series; the first left GOA unit is any one of the N left GOA units and the first right GOA unit is any one of the N right GOA units;

when the first left level shifting circuit works, the first left level shifting circuit generates a first left clock control signal to be outputted to the first left GOA unit through the first left clock line; when the first right level shifting circuit works, the first right level shifting circuit generates a first right clock control signal to be outputted to the first right GOA unit through the first right clock line; the first left clock control signal has the same timing as the first right clock control signal;

the first left over current protection sub circuit is fused when the first left clock control signal on the first left clock line is larger than a predetermined current threshold value to stop the first left level shifting sub circuit outputting the first left clock control signal to the first left GOA unit; the first right over current protection sub circuit is fused when the first right clock control signal on the first right clock line is larger than the predetermined current threshold value to stop the first right level shifting sub circuit outputting the first right clock control signal to the first right GOA unit.

7. The over current protection circuit according to claim 6, wherein both the first left over current protection sub circuit and the first right over current protection sub circuit are recoverable fuses.

8. The over current protection circuit according to claim 6, wherein the first left level shifting sub circuit comprises a first left controlling circuit and a first left amplifying circuit, when the first left level shifting sub circuit works, the first left amplifying circuit converts a clock signal inputted to the first left controlling circuit by a clock controller into the first left clock control signal; the first left controlling circuit controls the first left amplifying circuit to stop working when the first left over current protection sub circuit is fused.

9. The over current protection circuit according to claim 6, wherein the first right level shifting sub circuit comprises a first right controlling circuit and a first right amplifying circuit, when the first right level shifting sub circuit works, the first right amplifying circuit converts a clock signal inputted to the first right controlling circuit by a clock controller into the first right clock control signal; the first right controlling circuit controls the first right amplifying circuit to stop working when the first right over current protection circuit is fused.

10. A liquid crystal display, comprising a substrate array row driving gate driver on array (GOA) circuit having a dual driving function and an over current protection circuit, wherein the GOA circuit having the dual driving function comprises N left GOA units, N right GOA units, a left level shifting circuit and a right level shifting circuit, wherein the over current protection circuit comprises a left over current protection circuit and a right over current protection circuit, the left over current protection circuit comprises N left over current protection sub circuits and the right over current protection circuit comprises N right over current protection sub circuits, both the left over current protection sub circuits and the right over current protection sub circuits are fuses, the left level shifting circuit comprises N left level shifting sub circuits and the right level shifting circuit comprises N right level shifting sub circuits, each of the left GOA units is driven by a corresponding left level shifting sub circuit and each of the right GOA units is driven by a corresponding right level shifting sub circuit, N is an positive integer;

a first left GOA unit and a first left level shifting sub circuit are coupled through a first left clock line, a first left over current protection sub circuit is coupled to the first left clock line in series; a first right GOA unit and a first right level shifting sub circuit are coupled through a first right clock line, a first right over current protection sub circuit is coupled to the first right clock line in series; the first left GOA unit is any one of the N left GOA units and the first right GOA unit is any one of the N right GOA units;

when the first left level shifting circuit works, the first left level shifting circuit generates a first left clock control signal to be outputted to the first left GOA unit through the first left clock line; when the first right level shifting circuit works, the first right level shifting circuit generates a first right clock control signal to be outputted to the first right GOA unit through the first right clock line; the first left clock control signal has the same timing as the first right clock control signal;

the first left over current protection sub circuit is fused when the first left clock control signal on the first left clock line is larger than a predetermined current threshold value to stop the first left level shifting sub circuit outputting the first left clock control signal to the first left GOA unit; the first right over current protection sub circuit is fused when the first right clock control signal on the first right clock line is larger than the predetermined current threshold value to stop the first right level shifting sub circuit outputting the first right clock control signal to the first right GOA unit.

11. The liquid crystal display according to claim 10, wherein both the first left over current protection sub circuit and the first right over current protection sub circuit are recoverable fuses.

12. The liquid crystal display according to claim 10, wherein the first left level shifting sub circuit comprises a first left controlling circuit and a first left amplifying circuit, when the first left level shifting sub circuit works, the first left amplifying circuit converts a clock signal inputted to the first left controlling circuit by a clock controller into the first left clock control signal; the first left controlling circuit controls the first left amplifying circuit to stop working when the first left over current protection sub circuit is fused.

13. The liquid crystal display according to claim 10, wherein the first right level shifting sub circuit comprises a first right controlling circuit and a first right amplifying circuit, when the first right level shifting sub circuit works, the first right amplifying circuit converts a clock signal inputted to the first right controlling circuit by a clock controller into the first right clock control signal; the first right controlling circuit controls the first right amplifying circuit to stop working when the first right over current protection circuit is fused.

* * * * *